(12) United States Patent
Stewart

(10) Patent No.: US 7,091,451 B2
(45) Date of Patent: Aug. 15, 2006

(54) HEATING ELEMENT INDUCTION OF TIME-VARYING THERMAL GRADIENT IN ELONGATED BEAM TO CAUSE ONE OR MORE ELONGATED BEAM OSCILLATIONS

(75) Inventor: Robert E. Stewart, Woodland Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 23 days.

(21) Appl. No.: 10/600,553

(22) Filed: Jun. 20, 2003

(65) Prior Publication Data

US 2004/0256371 A1 Dec. 23, 2004

(51) Int. Cl.
*H05B 1/00* (2006.01)

(52) U.S. Cl. ............... 219/209; 219/200; 219/201; 73/504.14; 73/514.29

(58) Field of Classification Search ............ 219/200, 219/201, 213, 219, 210; 73/514.29, 504.14, 73/504.12, 504.4, 505, 708; 374/208, 118
See application file for complete search history.

(56) References Cited

U.S. PATENT DOCUMENTS

| 4,381,672 | A | 5/1983 | O'Connor et al. |
| 6,250,158 | B1 | 6/2001 | Stewart |
| 6,389,898 | B1 | 5/2002 | Seidel et al. |

FOREIGN PATENT DOCUMENTS

| EP | 0 574 143 | 12/1993 |
| WO | WO 93/05400 | 3/1993 |

OTHER PUBLICATIONS

Satchell, D.W. et al., "A Thermally-Excited Silicon Accelerometer", Sensors & Actuators, May 3, 1989, pp. 241-245, vol. 17, Lausanne, CH.

Othman, M.B. et al., "Electrothermally Excited Silicon Beam Mechanical Resonators", Electronics Letters, Jul. 2, 1987, pp. 728-730, vol. 23, United Kingdom.

V. Chandrasekaran, E. Chow, T. Kenny, T. Nishida, L. Cattafesta, B. Sankar & M. Sheplak; Thermoelastically Actuated Acoustic Proximity Sensor with Integrated Through-Wafer Interconnects; Jun. 2002; 6 pgs.; Solid-State Sensor, Actuator and Microsystems Workshop; Univesity of Flordia, Gainesville, FL 32611-6250.

"PIEZOELECTRIC"; http://www.techweb.com/encyclopedia/defineterm?term=piezoelectric; TechEncyclopedia; Computer Language Company, 5521 State Park Road, Point Pleasant, PA 18950; 1 pg.; Jul. 23, 2002.

(Continued)

*Primary Examiner*—John A. Jeffery
*Assistant Examiner*—L Fastovsky
(74) *Attorney, Agent, or Firm*—Carmen B. Patti & Assoc., LLC

(57) ABSTRACT

One or more heating elements comprise a heating element. One or more elongated beams comprise an elongated beam. The heating element is coupled with the elongated beam and induces a time-varying thermal gradient in the elongated beam to cause one or more oscillations of one or more of the one or more elongated beams.

16 Claims, 9 Drawing Sheets

OTHER PUBLICATIONS

"Dither"; http://www.dictionary.com/search?q=profile; Lexico, LLC; Lexico, LLC, 13428 Maxella Avenue #236, Marina del Rey, CA 90292; 2 pgs.; Jul. 23, 2002.

"Actuate"; http://www.dictionary.com/search?q=profile; Lexico, LLC; Lexico, LLC, 13428 Maxella Avenue #236, Marina del Rey, CA 90292; 1 pg.; Jul. 23, 2002.

"Transverse"; http://www.dictionary.com/search?q=profile; Lexico, LLC; Lexico, LLC, 13428 Maxella Avenue #236, Marina del Rey, CA 90292; 1 pg.; Jul. 23, 2002.

"Electrostatic"; http://www.dictionary.com/search?q=profile; Lexico, LLC; Lexico, LLC, 13428 Maxella Avenue #236, Marina del Rey, CA 90292; 1 pg.; Jul. 23, 2002.

"Joule heating, Kelvin (k), latent heat, lattice, laws of thermodynamics"; Glossary; http://www.uni.uiuc.edu/~hchiang/chem/glossary.html; 1 pg.; Jul. 23, 2002.

"Convergence, coriolis force, coulomb, cryoshpere, cumulonimbus (Cb)"; Mount Washington Observatory: Glossary of Weather Terms; http://www.mountwashington.org/glossary/glosc.html; 1 pg.; Jul. 23, 2002.

"Efficiency, frequency, hydrophone, hydrophone directivity, kHz (kilohertz), level sensor, main lobe, maximum response axis, omnidirectional, open circuit voltage, piezo-electric ceramic, pinger, projector, proximity sensor, receiver, resonant frequency, ringing, side lobe"; ITC Glossary of Transducer Terms; http://www.itc-transducers.com/168-0006.htm; 1 pg.; Jul. 23, 2002.

"Thermodynamcis, thermoelastic, thiol, tight-receptor structures, transition state, transition state theory"; Glossary T; http://www.foresight.org/Nanosystems/glossary/glossary_t.html; 1 pg.; Jul. 23, 2002.

"Nodal point, oscilation"; http://www.dictionary.reference.com/search?q=nodal%20point and http://www.dictionary.reference.com/search?q=oscillation; Lexico, LLC; Lexico, LLC, 13428 Maxella Avenue #236, Marina del Rey, CA 90292; 4 pgs.; Apr. 14, 2003.

HEATING ELEMENT INDUCTION OF TIME-VARYING THERMAL GRADIENT IN ELONGATED BEAM TO CAUSE ONE OR MORE ELONGATED BEAM OSCILLATIONS

TECHNICAL FIELD

The invention relates generally to electromechanical systems and more particularly to drive of movement and pickoff of signals in electromechanical systems.

BACKGROUND

Electromechanical devices are often used in systems to measure a parameter. For example, one system employs an array of elongated beams to measure an angular velocity. Drive components coupled with the array of elongated beams cause a first oscillation of the array of elongated beams. An angular velocity of the elongated beam and the first oscillation induce a Coriolis force on the array of elongated beams. The Coriolis force causes a second oscillation of the array of elongated beams. The second oscillation is substantially orthogonal to the first oscillation. Feedback components provide feedback on a magnitude of the first oscillation to the drive components for regulation of the first oscillation. Pickoff components sense the second oscillations to measure a magnitude of the angular velocity of the array of elongated beams.

The drive components, the feedback components, and the pickoff components in one example comprise piezoelectric films. As one shortcoming, the construction process of piezoelectric films for drive elements, feedback components, and pickoff components of an electromechanical device is costly and complex. The construction process requires the piezoelectric film to be deposited, patterned, and poled. As another shortcoming, piezoelectric films are sensitive to changes in temperature. As yet another shortcoming, the performance quality of piezoelectric films decreases over time.

Thus, a need exists for a promotion of a decrease in complexity of a construction process of systems that cause oscillations in elongated beams.

SUMMARY

The invention in one embodiment encompasses an apparatus. One or more heating elements comprise a heating element. One or more elongated beams comprise an elongated beam. The heating element is coupled with the elongated beam and induces a time-varying thermal gradient in the elongated beam to cause one or more oscillations of one or more of the one or more elongated beams.

Another embodiment of the invention encompasses another apparatus. One or more electrostatic elements comprise an electrostatic element. One or more elongated beams comprise an elongated beam. The electrostatic element is coupled with the elongated beam and employs a time-varying voltage to cause one or more oscillations of one or more of the one or more elongated beams.

A further embodiment of the invention encompasses a method. A time-varying thermal gradient is induced in an elongated beam, of one or more elongated beams, to cause one or more oscillations of one or more of the one or more elongated beams. An angular velocity of the one or more of the one or more elongated beams is measured by sensing a second oscillation of the one or more of the one or more elongated beams that results from a Coriolis effect on the one or more of the one or more elongated beams.

A still further embodiment of the invention encompasses another method. A time varying electrostatic force is induced on an elongated beam, of one or more elongated beams, to cause one or more oscillations of one or more of the one or more elongated beams. An angular velocity of the one or more of the one or more elongated beams is measured by sensing a second oscillation of the one or more of the one or more elongated beams that results from a Coriolis effect on the one or more of the one or more elongated beams.

DESCRIPTION OF THE DRAWINGS

Features of exemplary implementations of the invention will become apparent from the description, the claims, and the accompanying drawings in which:

DETAILED DESCRIPTION

Figure 1:
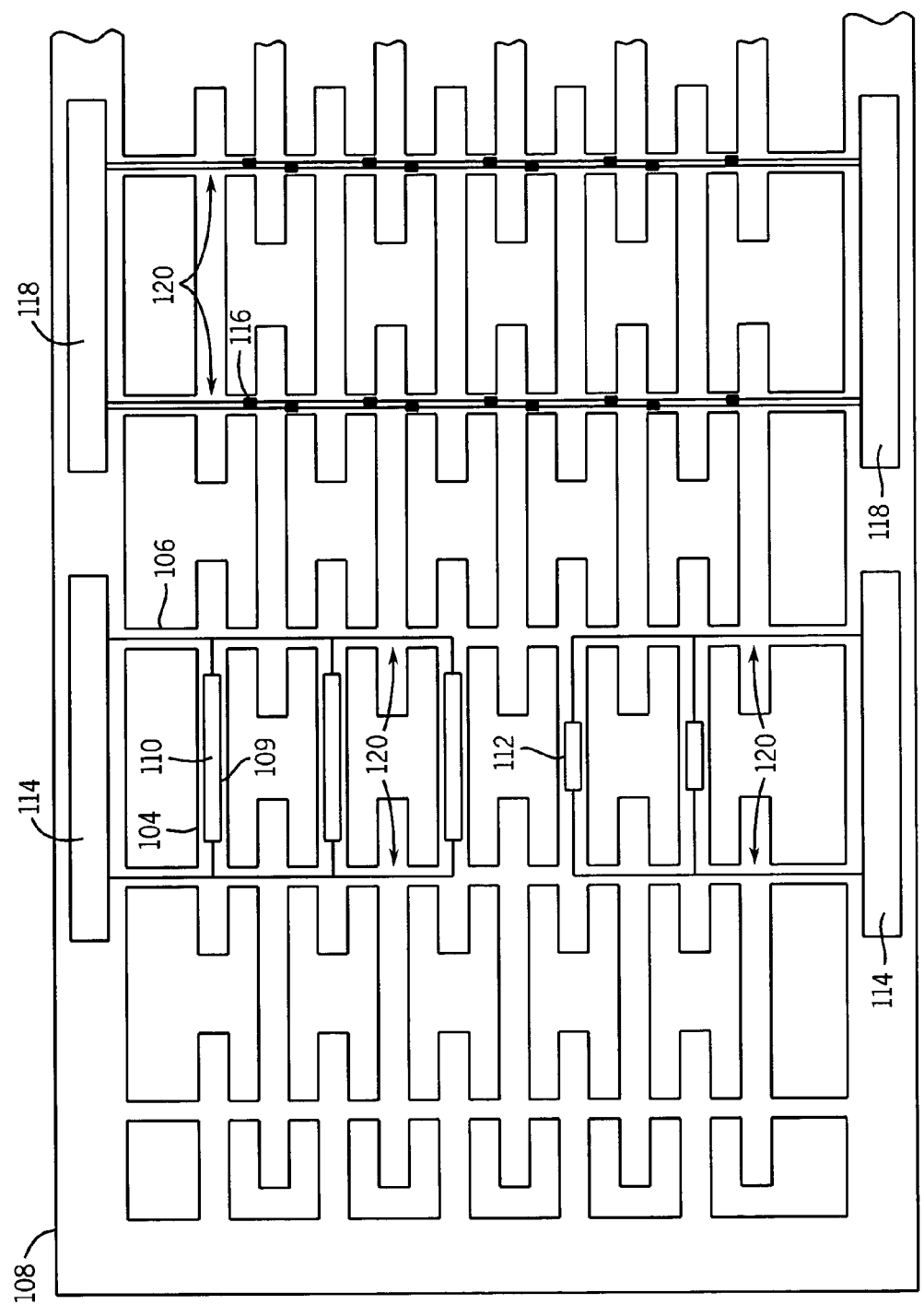
FIG. 1 is a top, partial representation of one exemplary implementation of an apparatus that comprises one or more elongated beams, one or more transverse beams, a frame, one or more heating elements, one or more feedback components, one or more regulator components, one or more pickoff components, one or more processor components, and one or more electrical traces.

Turning to FIG. 1, an apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

Figure 2:
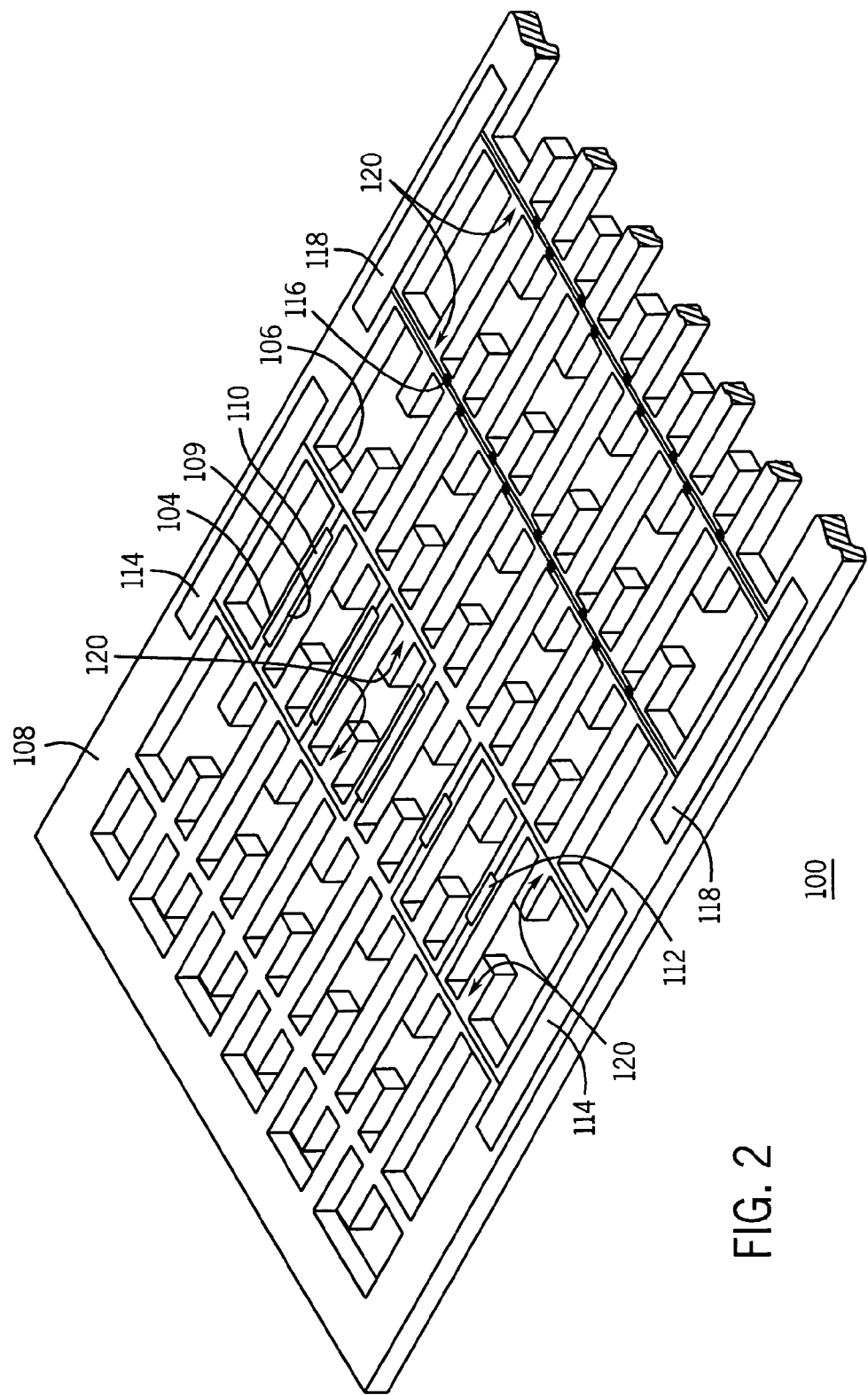
FIG. 2 is another partial, perspective representation of the exemplary implementation of the apparatus of FIG. 1.

Referring to FIGS. 1 and 2, the apparatus 100 in one example comprises one or more elongated beams 104, one or more transverse beams 106, a frame 108, one or more drive components 109, one or more feedback components 112, one or more regulator components 114, one or more pickoff components 116, one or more processor components 118, and one or more electrical traces 120. The elongated beams 104, the transverse beams 106, and the frame 108 in one example comprise an integral planar structure. In a further example, the integral planar structure comprises silicon. The elongated beams 104 in one example are aligned substantially in parallel. A transverse beam 106 in one example abuts two or more elongated beams 104. For example, the transverse beam 106 abuts the elongated beams 104 at a null point or a nodal point of vibration of the elongated beams 104 to promote a harmonic oscillation between the elongated beams 104, as described herein. The transverse beams 106 in one example serve to support the elongated beams 104 in an aperture of the frame 108. In a further example, the transverse beams 106 serve to couple one or more of the elongated beams 104.

The one or more drive components 109 in one example are coupled with one or more of the elongated beams 104. In one example, a plurality of the drive components 109 are coupled with the elongated beam 104. For example, the plurality of the drive components 109 are coupled with the elongated beam 104 on opposing sides of the elongated beam 104. In another example, the drive component 109 is coupled to one of the elongated beams 104 to reduce the cost to manufacture. In yet another example, the drive component 109 is coupled with a plurality of the elongated beams 104. The drive component 109 in one example is coupled with the regulator component 114 by the electrical traces 120. The drive component 109 causes one or more drive oscillations of the elongated beams 104. In one example the regulator component 114 is integral with the frame 108. In another example, the regulator component 114 is remotely located and coupled with the drive component 109 through electrical contact pads (not shown), as will be appreciated by those skilled in the art. The one or more regulator components 114 in one example comprise a same regulator component 114. The regulator component 114 in one example serves to regulate the one or more drive oscillations of the elongated beam 104, as described herein. The electrical traces 120 serve to couple the drive components 109, the feedback components 112, the regulator components 114, the pickoff components 116, and the processor components 118.

The drive components 109 in one example comprise one or more heating elements 110. The heating element 110 in one example creates and exudes thermal energy that is absorbed by the elongated beam 104 with which the heating element 110 is coupled. The heating element 110 in one example comprises a resistor. The resistor conducts a time-varying electrical current that induces a Joule heating of the resistor to create the thermal energy. The elongated beam 104 absorbs the thermal energy, which induces a thermal gradient in the elongated beam 104. The thermal gradient initiates thermoelastic actuation of the elongated beam 104. For example, the thermal gradient of the elongated beam 104 causes the drive oscillations of the elongated beam 104. The heating element 110 in one example substitutes for a piezoelectric film as the drive component 109 to promote a decrease in complexity of construction.

Figure 3:
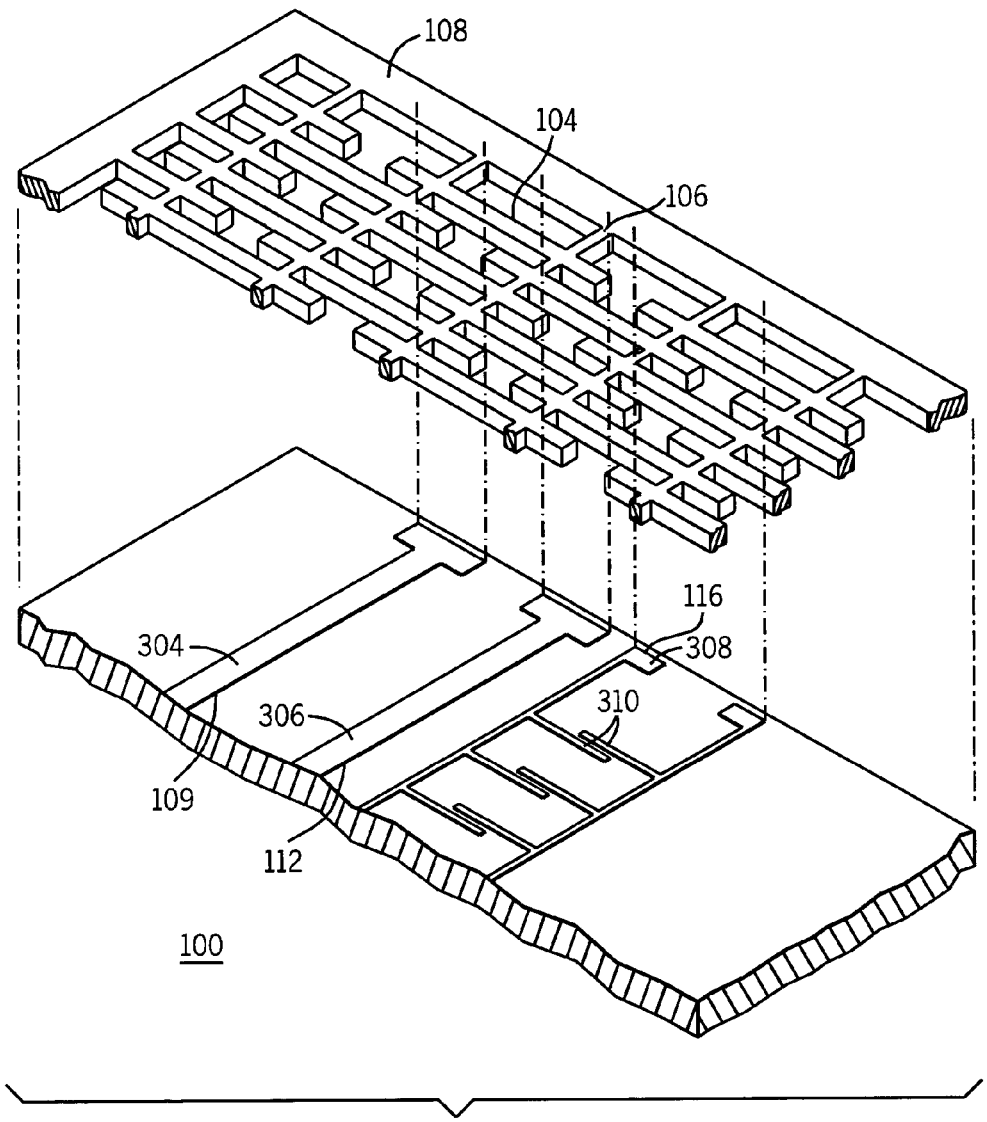
FIG. 3 is an exploded, partial, perspective representation of another exemplary implementation of the apparatus of FIG. 1 that comprises one or more elongated beams, one or more transverse beams, a frame, one or more drive components, one or more feedback components, one or more regulator components, one or more pickoff components, and one or more processor components.
Figure 12:
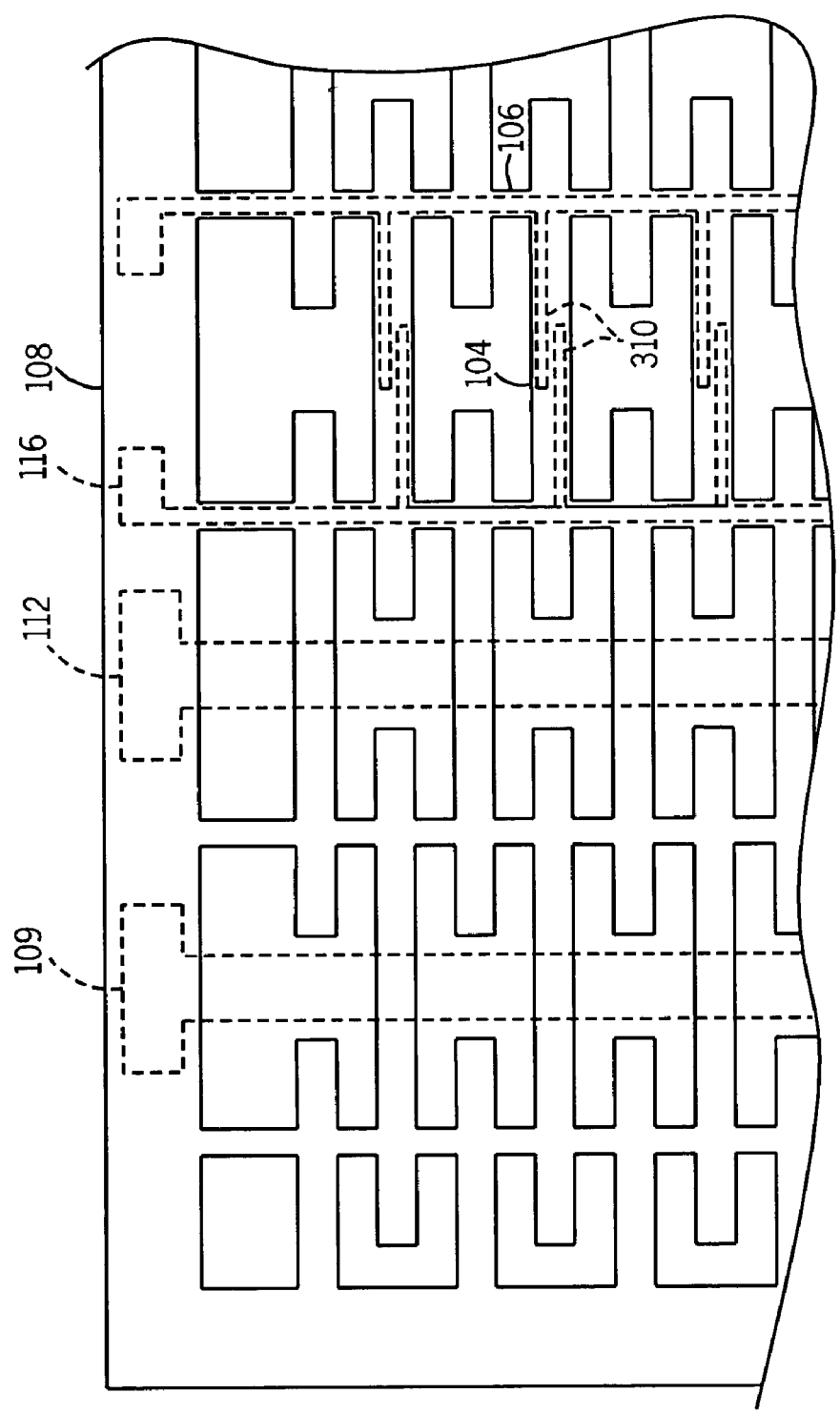
FIG. 12 is a top, partial representation of the exemplary implementation of the apparatus of FIG. 3.

Turning to FIGS. 3 and 12, the drive components 109 in one example comprise an electrostatic component 304. The electrostatic component 304 in one example induces an electrostatic force on the elongated beam 104 with which the electrostatic component 304 is coupled. The electrostatic component 304 in one example comprises an electrode. A time-varying voltage on the electrode induces the electrostatic force on the elongated beam 104. The electrostatic force on the elongated beam 104 in one example causes the drive oscillations of the elongated beam 104. The electrostatic component 304 in one example substitutes for a piezoelectric film as the drive component 109 to promote a decrease in complexity of construction.

Referring to FIG. 1, the one or more feedback components 112 in one example are coupled with one or more elongated beams 104. In one example, a plurality of the feedback components 112 are coupled with the elongated beam 104. For example, the plurality of feedback components 112 are coupled with the elongated beam 104 on opposing sides of the elongated beam 104. In another example, the feedback component 112 is coupled with one of the elongated beams 104 to reduce the cost to manufacture. In yet another example, the feedback component 112 is coupled with a plurality of the elongated beams 104. The feedback component 112 is coupled with the regulator component 114 by the electrical traces 120. The feedback component 112 in one example serves to provide feedback to the regulator component 114, as described herein.

The drive oscillation of the elongated beam 104 in one example causes a stress and/or movement in the elongated beam 104. The stress and/or movement of the elongated beam 104 in one example causes a change in the feedback provided by the feedback component 112 with which the elongated beam 104 is coupled.

The feedback provided by the feedback component 112 in one example corresponds to a frequency and/or amplitude of the drive oscillation of the elongated beam 104. The regulator component 114 employs the feedback provided by the feedback components 112 with which the regulator component 114 is coupled to regulate the drive component 109. In one example, the drive component 109 comprises a resistor. The regulator component 114 regulates the time-varying electrical current through the resistor such that the frequency and/or the amplitude of the drive oscillation of the elongated beam 104 remain within a desired range. In another example, the drive component 109 comprises an electrode. The regulator component 114 regulates the time-varying voltage on the electrode such that the frequency and/or the amplitude of the drive oscillation of the elongated beam 104 remain within the desired range.

The frequency of the drive oscillation of the elongated beam 104 in one example promotes a propagation of the drive oscillation of the elongated beam 104. For example, the desired range of the frequency of the drive oscillations of the elongated beam 104 comprises a natural frequency of the elongated beam 104. A first one of the elongated beams 104 comprises a natural frequency that is substantially the same as a second one of the elongated beams 104. For example, each of the elongated beams 104 comprises a substantially similar natural frequency. The drive component 109 causes one or more first drive oscillations in a first elongated beam of the elongated beams 104 with which the drive component 109 is directly coupled. One of the transverse beams 106 in one example couples the first elongated beam with a second elongated beam of the elongated beams 104. The one or more first drive oscillations of the first elongated beam in one example propagate through the transverse beam to cause one or more second drive oscillations of the second elongated beam. The first drive oscillations of the first elongated beam and the second drive oscillations of the second elongated beam in one example comprise a same natural frequency and/or amplitude.

The one or more pickoff components 116 in one example are coupled with one or more transverse beams 106. In one example, a plurality of the pickoff components 116 are coupled with the transverse beam 106. For example, the plurality of pickoff components 116 are coupled with the transverse beam 106 on opposing sides of the transverse beam 106. In another example, the pickoff component 116 is coupled with one of the transverse beams 106 to reduce the cost to manufacture. The pickoff component 116 in yet another example is coupled with a plurality of the transverse beams 106. The pickoff component 116 in one example is coupled with the elongated beam 104. The pickoff components 116 are coupled with the processor component 118 by the electrical traces 120. The pickoff components 116 in one example serve to provide feedback to the processor component 118, as described herein. In one example the processor component 118 is integral with the frame 108. In another example, the processor component 118 is remotely located and coupled with the pickoff component 116 through electrical contact pads (not shown), as will be appreciated by those skilled in the art. The one or more processor components 118 in one example comprise a same processor component 118. The processor component 118 and the regulator component 114 in one example comprise a same component.

An angular velocity and the drive oscillations of the elongated beam 104 in one example induce a Coriolis effect in the elongated beam 104. The angular velocity of the elongated beam 104 in one example is about an axis parallel to a major axis of the elongated beam 104. The Coriolis effect causes one or more transverse oscillations of the elongated beam 104. The transverse oscillations of the elongated beam 104 in one example are substantially orthogonal to the drive oscillations of the elongated beam 104.

The transverse oscillation of the elongated beam 104 in one example causes a stress and/or movement of the transverse beam 106 with which the elongated beam 104 is coupled. The stress and/or movement of the transverse beam 106 in one example causes a change in the feedback provided by the pickoff component 116 with which the transverse beam 106 is coupled. The transverse oscillation of the elongated beam 104 in one example causes a change in the feedback provided by the pickoff component 116 with which the elongated beam 104 is coupled.

The feedback provided by the pickoff component 116 in one example corresponds to a frequency and/or amplitude of the transverse oscillations of the elongated beam 104. The processor component 118 in one example employs the feedback from the pickoff components 116 with which the processor component 118 is coupled to determine a magnitude of the transverse oscillations of the elongated beam 104. In a further example, the processor component 118 employs the magnitude of the transverse oscillations of the elongated beam 104 to determine a magnitude of the angular velocity of the elongated beam 104. The processor component 118 in one example is coupled with the regulator component 114. For example, the processor component 118 employs the regulator component 114 to determine the magnitude of the transverse oscillations and/or angular velocity of the elongated beam 104. The processor component 118 in one example comprises an interface for communication with an external device (not shown), as will be appreciated by those skilled in the art. For example, the processor component 118 communicates with a display device to display the angular velocity of the elongated beam 104.

In one example, the feedback components 112 and/or the pickoff components 116 comprise one or more piezoresistors. The piezoresistor in one example comprises a variable resistance. For example, the piezoresistor is coupled with the elongated beam 104 such that a stress and/or movement of the elongated beam 104 causes a change in the variable resistance of the piezoresistor. In another example, the piezoresistor is coupled with the transverse beam 106 such that a stress and/or movement of the transverse beam 106 causes a change in the variable resistance of the piezoresistor. The piezoresistor generates feedback that corresponds to the variable resistance of the piezoresistor. The piezoresistor in one example substitutes for a piezoelectric film as the feedback components 112 and/or the pickoff components 116 to promote a decrease in complexity of construction.

In another example, the feedback components 112 comprise one or more capacitive sensors 306 (FIG. 3) and the pickoff components 116 comprise one or more capacitive sensors 308 (FIG. 3). The capacitive sensors 306 and 308 in one example comprise a variable capacitance. The capacitive sensor 306 in one example is coupled with the elongated beam 104 such that a movement of the elongated beam 104 causes a change in the variable capacitance of the capacitive sensor 306. For example, the drive oscillation of the elongated beam causes the change in the variable capacitance of the capacitive sensor 306. The capacitive sensor 308 in one example is coupled with the elongated beam 104 such that a movement of the elongated beam 104 causes a change in the variable capacitance of the capacitive sensor 308. For example, the transverse oscillations of the elongated beam 104 causes the change in the variable capacitance of the capacitive sensor 308. The feedback provided by the capacitive sensors 306 and 308 corresponds to the variable capacitance of the respective capacitive sensor 306 and 308. The capacitive sensors 306 and 308 in one example substitute for a piezoelectric film as the feedback components 112 and/or the pickoff components 116 to promote a decrease in complexity of construction.

The capacitive sensor 306 in one example comprises an electrode. For example, the electrode is coupled with the elongated beam 104 such that a drive oscillation of the elongated beam 104 causes a change in the variable capacitance of the capacitive sensor 306. In one example, the electrode that comprises the capacitive sensor 306 and the electrode that comprises the electrostatic component 304 comprise a same electrode.

The capacitive sensors 308 in one example comprise one or more interdigitated beams 310. The interdigitated beams 310 in one example are coupled with the elongated beam 104 such that a movement of the elongated beam 104 causes a change in the variable capacitance of the capacitive sensor 308. For example, the transverse oscillations of the elongated beam 104 cause the change in the variable capacitance of the capacitive sensor 308.

The feedback components 112 and the pickoff components 116 in one example comprise a combination of piezoresistors and/or capacitive sensors. In a first example, the feedback components 112 and the pickoff components 116 comprise piezoresistors or capacitive sensors. In a second example, the feedback components 112 and the pickoff components 116 comprise capacitive sensors. In a third example, the feedback components 112 comprise capacitive sensors and the pickoff components 116 comprise piezoresistors. In a fourth example, the feedback components 112 comprise piezoresistors and the pickoff components 116 comprise capacitive sensors.

Referring to FIGS. 3 and 12, the drive components 109 in one example comprise electrostatic components 304. The feedback components 112 in one example comprise one or more capacitive sensors 306. The electrostatic components 304 and the capacitive sensors 306 in one example are coupled with the regulator component 114. The pickoff components comprise one or more capacitive sensors 308.

Figure 4:
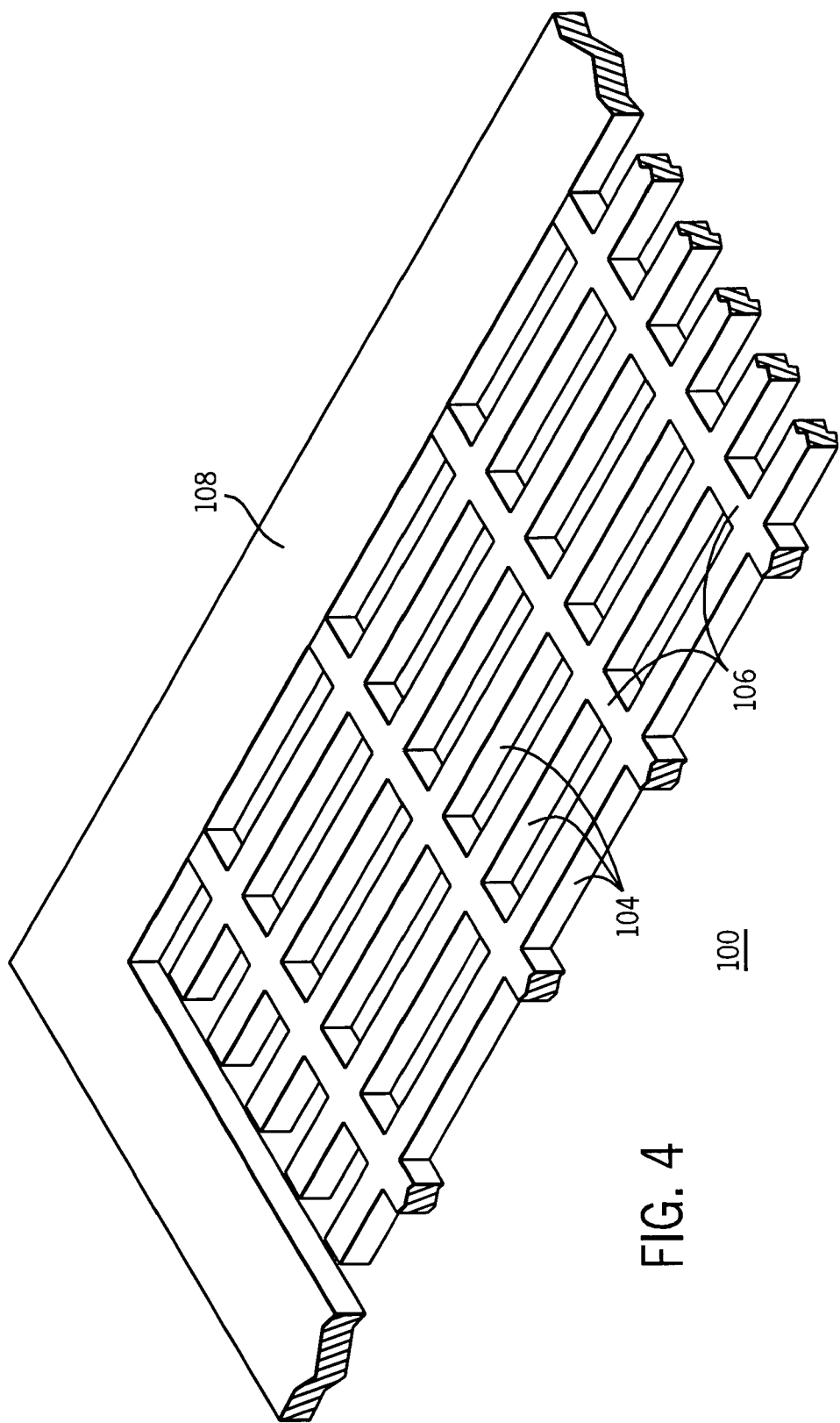
FIG. 4 is a partial, perspective representation of a further exemplary implementation of the apparatus of FIG. 1 that comprises one or more elongated beams, one or more transverse beams, and a frame.

Turning to FIG. 4, the elongated beams 104 in one example are integral. The transverse beams 106 abut the elongated beams 104 at a plurality of nodal points of the elongated beams 104. The configuration presented in FIG. 3 in one example reduces the cost and/or difficulty of manufacture, increases available surface area for drive components, feedback components, and pickoff components, and allows for higher harmonic frequencies to be used.

Figure 5:
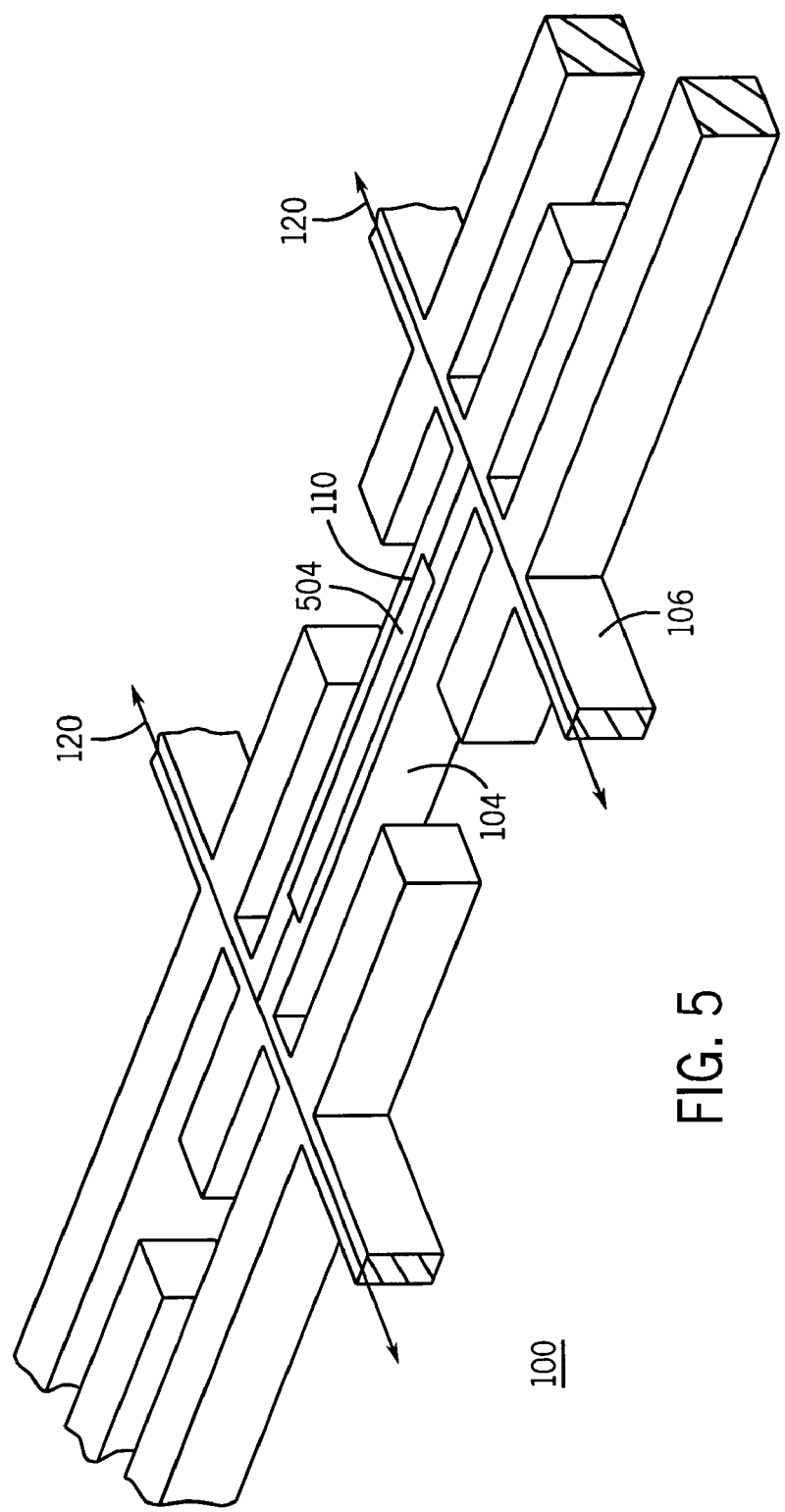
FIG. 5 is a partial, perspective representation of exemplary details of the elongated beams, the transverse beams, and the heating elements of the apparatus of FIG. 1.

Turning to FIG. 5, the heating element 110 in one example comprises a resistor 504. The electrical traces 120 in one example serve to provide an electrical connection between the resistor 504 and the regulator component 114 (FIG. 1). The regulator component 114 (FIG. 1) regulates the oscillation of the elongated beam 104 by regulating the electrical current through the electrical traces 120 to the resistor 504.

Figure 6:
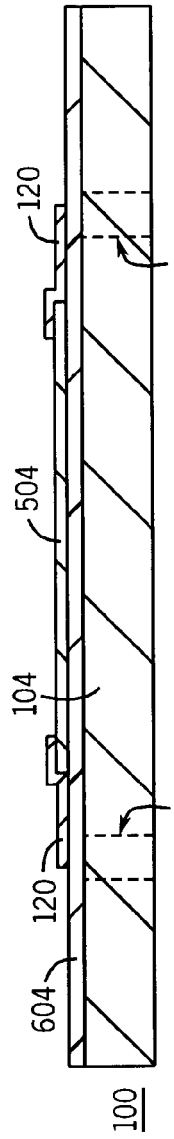
FIG. 6 is a partial, side representation of exemplary details of the elongated beams, the transverse beams, and the heating elements of the apparatus of FIG. 1.

Turning to FIG. 6, the apparatus 100 in one example further comprises a dielectric layer 604. The dielectric layer 604 serves to promote isolation of the electrical current through the resistor 504 and the electrical traces 120 from the elongated beam 104 and one or more transverse beams 106, as will be understood by those skilled in the art.

Figure 7:
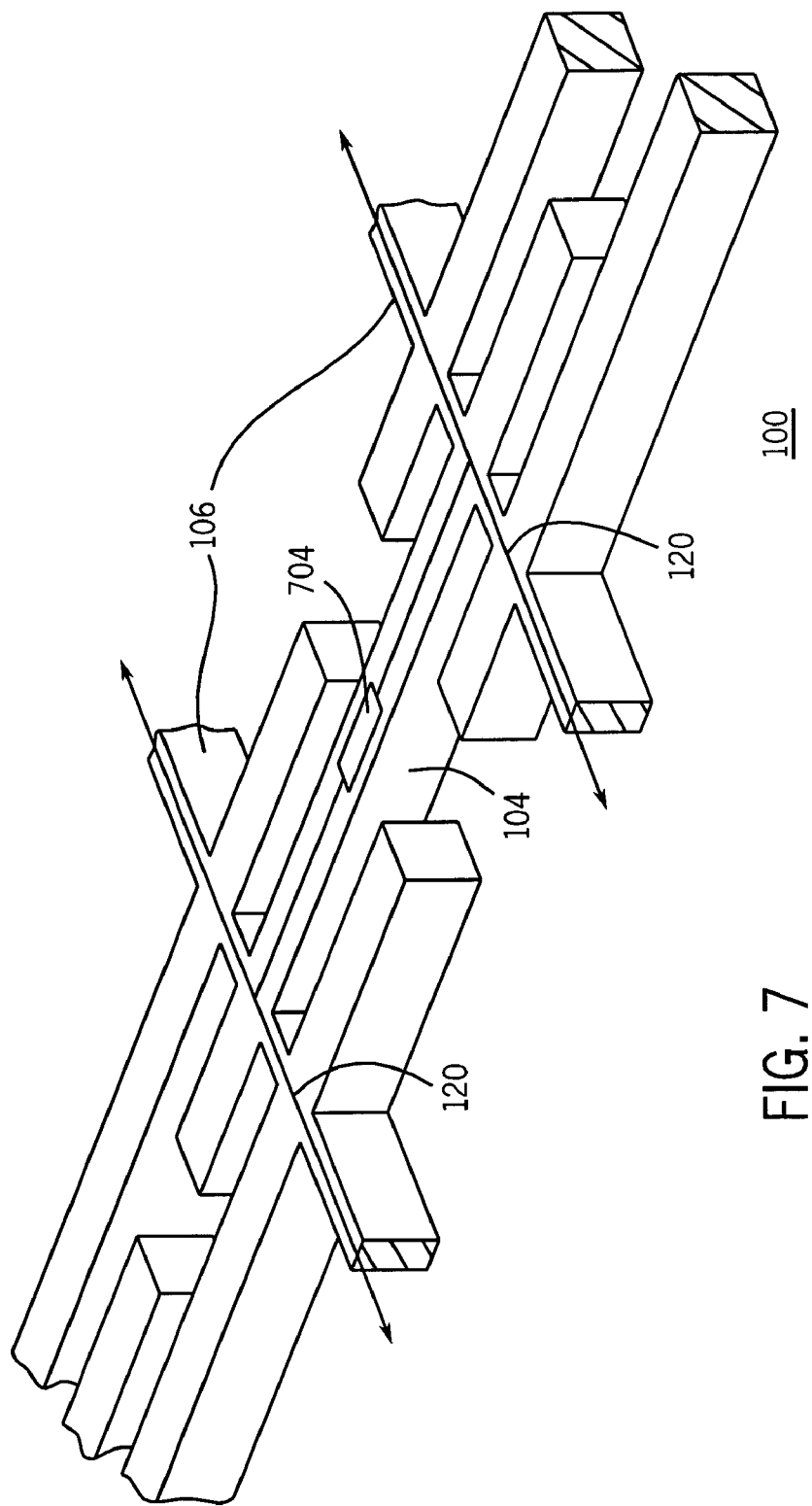
FIG. 7 is a partial, perspective representation of exemplary details of the elongated beams, the transverse beams, and the feedback components of the apparatus of FIG. 1.

Turning to FIG. 7, the apparatus 100 in one example further comprises a piezoresistor 704. The piezoresistor 704 serves as an exemplary feedback component 112. The electrical traces 120 in one example serve to provide an electrical connection between the piezoresistor 704 and the regulator component 114 (FIG. 1). In one example, the regulator component 114 (FIG. 1) regulates the electrical current through the resistor 504 (FIG. 5) based on the resistance of the piezoresistor 704.

Figure 8:
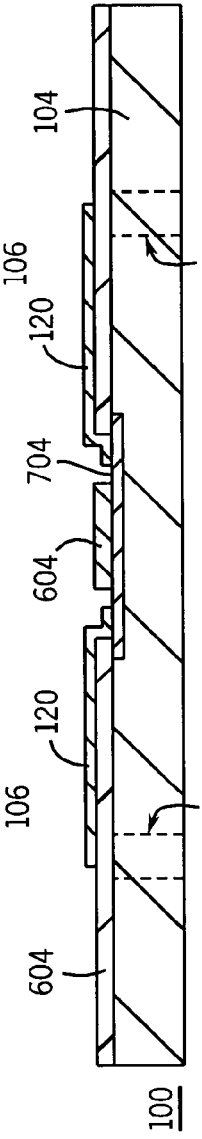
FIG. 8 is a partial, side representation of exemplary details of the elongated beams, the transverse beams, and the feedback components of the apparatus of FIG. 1.

Turning to FIG. 8, the apparatus 100 in one example comprises the elongated beam 104, the transverse beams 106, the dielectric layer 604, the piezoresistor 704, and the electrical traces 120. The dielectric layer 604 in one example serves to promote isolation of the electrical connection between the electrical traces 120 and the beams 104 and 106.

Figure 9:
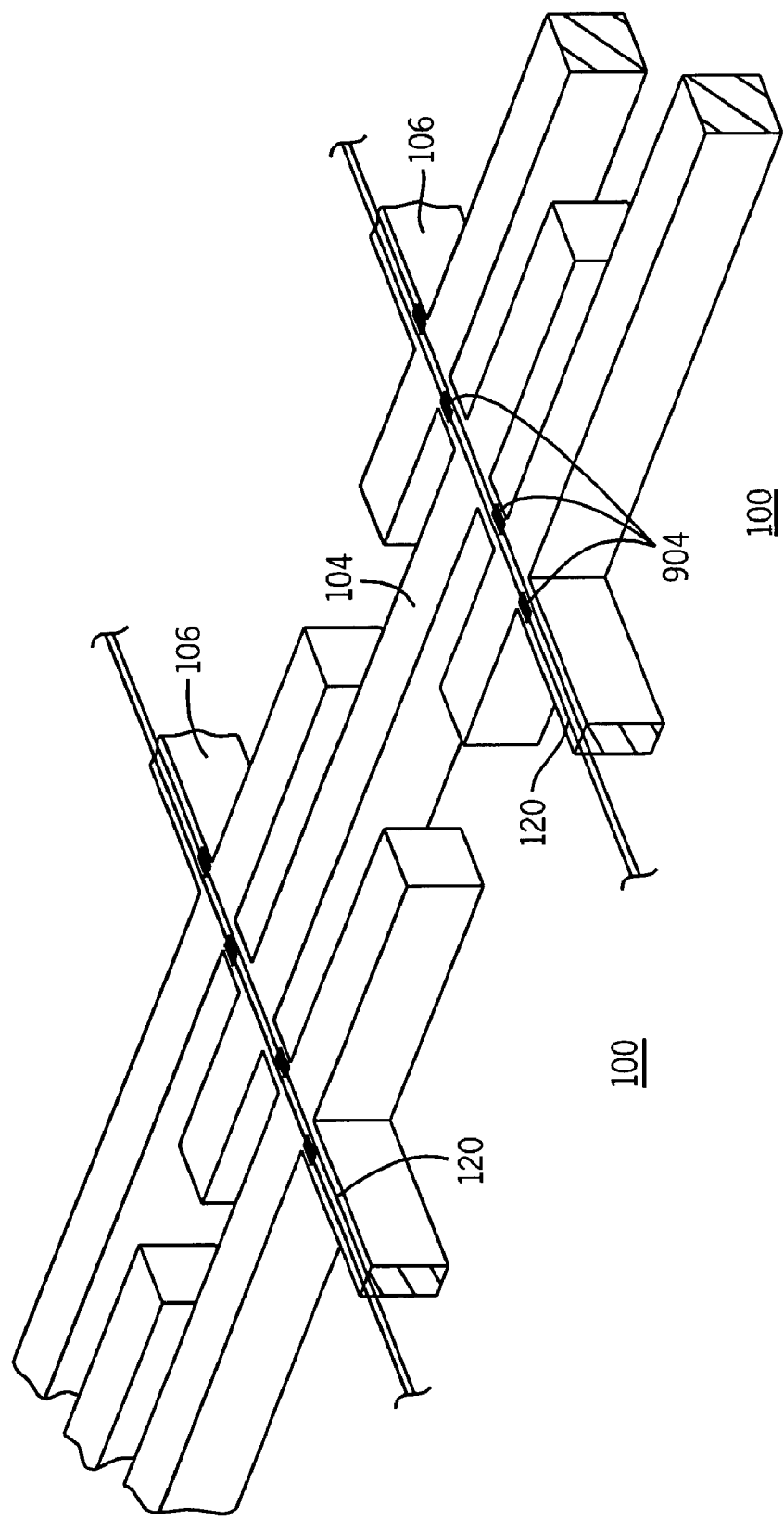
FIG. 9 is a partial, side representation of exemplary details of the elongated beams, transverse beams, and pickoff components of the apparatus of FIG. 1.

Turning to FIG. 9, the apparatus 100 in one example comprises the elongated beam 104, the transverse beams 106, one or more piezoresistors 904, and one or more electrical traces 120. The piezoresistors 904 in one example serve as pickoff components 116. The electrical traces 120 in one example serve to provide an electrical connection between the piezoresistors 904 and the processor component 118 (FIG. 1). In one example, the processor component 118 (FIG. 1) measures the feedback provided by the pickoff component 116, for example, the resistance of the piezoresistor 904, and determines the relative strength of the external force on the elongated beams 104.

Figure 10:
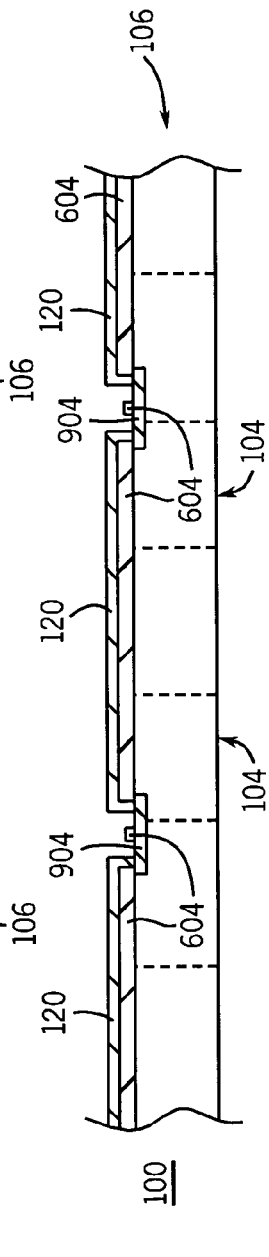
FIG. 10 is a partial, side representation of exemplary details of the elongated beams, the transverse beams, and the pickoff components of the apparatus of FIG. 1.

Turning to FIG. 10, the apparatus 100 in one example comprises the elongated beams 104, the transverse beams 106, the dielectric layer 604, the piezoresistors 904, and the electrical trace 120. The dielectric layer 604 in one example serves to promote isolation of the electrical connection between the electrical traces 120 and the beams 104 and 106.

Figure 11:
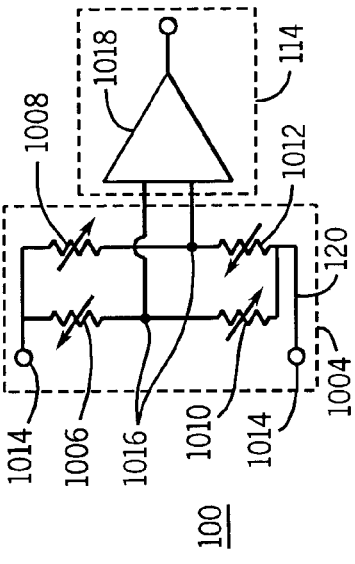
FIG. 11 is a representation of one example of a Wheatstone bridge arrangement for the feedback components, the regulator component, and the electrical traces of the apparatus of FIG. 1.

Turning to FIG. 11, a Wheatstone bridge 1004 and the regulator component 114 in one example cooperate to regulate the current through the heating element 110 (FIG. 1). In one example, the Wheatstone bridge 1004 comprises the electrical traces 120 and the feedback components 112, for example, piezoresistors 1006, 1008, 1010, and 1012. The piezoresistors 1006, 1008, 1010, and 1012 are coupled to elongated beams 104 (FIG. 1) as previously described. Input terminals 1014 of the Wheatstone bridge 1004 in one example are electrically connected to a voltage source that serves to provide an electrical current through the Wheatstone bridge 1004. Output terminals 1016 of the Wheatstone bridge 1004 in one example are electrically connected to the regulator component 114. It is well known by those skilled in the art that the electrical current through the output terminals 1016 of the Wheatstone bridge 1004 will correspond to a combined resistance of the piezoresistors 1006, 1008, 1010, and 1012. In one example, the regulator component 114 regulates the current through the heating element 110 (FIG. 1) based on the current through the output terminals 1016. The regulator component 114 in one example comprises a difference amplifier 1018. The difference amplifier 1018 in one example serves to promote accurate readings by the regulator component 114 by amplifying the current flow across the output terminals 1016.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   one or more heating elements;
   plurality of elongated beams; and
   one or more transverse beams;
   wherein the one or more heating elements comprise a heating element, wherein the plurality of elongated beams comprise a first and a second elongated beam, wherein the one or more transverse beams comprise a transverse beam;
   wherein the heating element is coupled with the first elongated beam;
   wherein the heating element induces a time-varying thermal gradient in the first elongated beam to cause one or more drive oscillations of first elongated beam;
   wherein a nodal point of the first elongated beam abuts a first face of the transverse beam;
   wherein a nodal point of the second elongated beam abuts a second face of the transverse beam;
   wherein the heating element cooperates with the first elongated beam to cause one or more drive oscillations of the second elongated beam.

2. The apparatus of claim 1, wherein the heating element employs the time-varying thermal gradient in the first elongated beam to cause one or more thermoelastic reactions in the first elongated beam that effect one or more of the one or more drive oscillations.

3. The apparatus of claim 1, wherein the heating element comprises a resistor;

wherein the resistor conducts a time-varying electrical signal, wherein the time-varying electrical signal induces a Joule heating of the resistor that causes the time-varying thermal gradient in the first elongated beam.

4. The apparatus of claim 1, wherein the heating element induces the time-varying thermal gradient in the first elongated beam to cause the one or more drive oscillations to occur approximately at a natural frequency of the first elongated beam.

5. The apparatus of claim 1, wherein the heating element oscillates the first elongated beam to stress the transverse beam to cause the one or more drive oscillations of the second elongated beam.

6. The apparatus of claim 1, wherein the heating element induces the time-varying thermal gradient in the first elongated beam to cause the one or more drive oscillations to occur approximately at a natural frequency of the plurality of elongated beams.

7. The apparatus of claim 1, further comprising:
a feedback component coupled with the first elongated beam;
wherein the feedback component provides feedback to a regulator component that serves to regulate one or more of the one or more drive oscillations of the one or more of the plurality of elongated beams.

8. The apparatus of claim 1, wherein the one or more drive oscillations of the one or more of the plurality of elongated beams comprise a harmonic oscillation of the one or more of the plurality of elongated beams.

9. The apparatus of claim 3, wherein the resistor conducts a time-varying electrical current to induce the Joule heating of the resistor.

10. The apparatus of claim 7, wherein the feedback component comprises a piezoresistor;
wherein the piezoresistor comprises a variable resistance that changes based on a magnitude of the one or more of the one or more drive oscillations of the one or more of the plurality of elongated beams;
wherein the piezoresistor provides feedback based on the variable resistance of the piezoresistor to the regulator component that serves to regulate the time-varying thermal gradient in the first elongated beam to cause the one or more drive oscillations of the one or more of the plurality of elongated beams.

11. The apparatus of claim 7, further comprising:
a plurality of feedback components that are coupled with one or more of the plurality of elongated beams, wherein the plurality of feedback components comprise the feedback component.

12. The apparatus of claim 11, wherein the plurality of feedback components are arranged in a Wheatstone bridge;
wherein the regulator component and the Wheatstone bridge cooperate to regulate the time-varying thermal gradient through the resistor.

13. The apparatus of claim 12 in combination with the regulator component, wherein the regulator component comprises a difference amplifier.

14. The apparatus of claim 13, wherein the difference amplifier serves to amplify a current flow across a plurality of output terminals of the Wheatstone bridge;
wherein the regulator component employs the current flow across the output terminals of the Wheatstone bridge to regulate the time-varying thermal gradient through the resistor.

15. The apparatus of claim 14, wherein the heating element comprises a resistor that conducts a time-varying electrical current, wherein the time-varying electrical current induces a Joule heating of the resistor that causes the time-varying thermal gradient in the first elongated beam.

16. The apparatus of claim 15, wherein the regulator component regulates the time-varying electrical current through the resistor to keep a frequency and/or an amplitude of the one or more drive oscillations of the first elongated beam remain within a desired range.

* * * * *